US012780214B2

(12) United States Patent
Yun et al.

(10) Patent No.: US 12,780,214 B2
(45) Date of Patent: Nov. 3, 2026

(54) VEHICLE EQUIPPED WITH A SENSOR INFORMATION FUSION DEVICE AND A MERGING METHOD USING THE SAME

(71) Applicants: HYUNDAI MOTOR COMPANY, Seoul (KR); KIA CORPORATION, Seoul (KR)

(72) Inventors: Bo Young Yun, Namyangju-si (KR); In Sun Lee, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 129 days.

(21) Appl. No.: 18/526,665

(22) Filed: Dec. 1, 2023

(65) Prior Publication Data

US 2024/0199028 A1 Jun. 20, 2024

(30) Foreign Application Priority Data

Dec. 16, 2022 (KR) ........................ 10-2022-0177076

(51) Int. Cl.
*B60W 40/02* (2006.01)
*G01S 17/86* (2020.01)

(52) U.S. Cl.
CPC ............ *B60W 40/02* (2013.01); *G01S 17/86* (2020.01); *B60W 2420/408* (2024.01); *B60W 2554/4041* (2020.02); *B60W 2556/35* (2020.02)

(58) Field of Classification Search
CPC ......... B60W 40/02; B60W 2554/4041; B60W 2556/35; B60W 2420/408; G01S 17/86
See application file for complete search history.

(56) References Cited

U.S. PATENT DOCUMENTS 9,288,381 B2 3/2016 Irie et al.
9,789,821 B2 10/2017 Baur et al.
10,255,812 B2 * 4/2019 Lee ........................ G08G 1/166
10,388,153 B1 8/2019 Swaminathan et al.
11,186,223 B2 11/2021 Kang
2017/0236421 A1 * 8/2017 Yang ..................... G01S 13/931 701/301
2018/0089538 A1 * 3/2018 Graham ................ G01S 13/726
2018/0101732 A1 * 4/2018 Uchiyama ............... G06T 7/292
(Continued)

FOREIGN PATENT DOCUMENTS

JP 6561869 B2 8/2019
KR 101927162 B1 12/2018
KR 20200040154 A 4/2020

*Primary Examiner* — Naeem Taslim Alam
(74) *Attorney, Agent, or Firm* — Lempia Summerfield Katz LLC

(57) ABSTRACT

A vehicle includes a sensing device including one or more sensors configured to obtain information on a target object present around the vehicle. The vehicle also includes a sensor information fusion device including a processor configured to generate or maintain a sensor fusion track using the information on the target object provided by the sensing device. The processor is configured to generate one or more tracks using the information on the target object provided by the one or more sensors. The processor is also configured to determine a similarity between the generated one or more tracks and generate the sensor fusion track. The processor is further configured to manage the generated sensor fusion track.

20 Claims, 17 Drawing Sheets

(56) References Cited

U.S. PATENT DOCUMENTS

| | | | | |
|---|---|---|---|---|
| 2018/0253848 | A1* | 9/2018 | Chen | G06T 7/11 |
| 2018/0330175 | A1* | 11/2018 | Corcoran | H04N 7/181 |
| 2020/0050195 | A1* | 2/2020 | Gross | B60W 10/06 |
| 2020/0108771 | A1 | 4/2020 | Kang | |
| 2021/0261162 | A1* | 8/2021 | Hiramatsu | G08G 1/167 |
| 2021/0406082 | A1* | 12/2021 | Asao | G06F 9/5038 |
| 2023/0124314 | A1* | 4/2023 | Foster | B60W 30/09<br>701/26 |
| 2023/0408686 | A1* | 12/2023 | Lin | G01S 13/726 |
| 2024/0409127 | A1* | 12/2024 | Ramakrishnan | G06N 7/01 |

* cited by examiner

VEHICLE EQUIPPED WITH A SENSOR INFORMATION FUSION DEVICE AND A MERGING METHOD USING THE SAME

CROSS-REFERENCE TO RELATED APPLICATION

This application claims the benefit of and priority to Korean Patent Application No. 10-2022-0177076, filed on Dec. 16, 2022, the entire disclosure of which is hereby incorporated herein by reference.

TECHNICAL FIELD

The present disclosure relates to a vehicle including a sensor information fusion device and an absorption and merging method using the same.

BACKGROUND

A typical autonomous driving recognition system may be designed to maximize the strengths of sensors through a fusion of heterogeneous sensor information.

A light detection and ranging (lidar) sensor may have a desirable precision and may thus play an important role in estimating the positions and shapes of objects.

The typical autonomous driving recognition system, in many cases, is designed such that when mass-producing a lidar sensor for autonomous driving level 3, the lidar sensor recognizes only a front area that has a major influence on control to have price competitiveness.

In the typical autonomous driving recognition system, sensors configured to recognize the lateral sides of a host vehicle may include a front corner lidar (FCL) sensor and a front/rear corner radio detection and ranging (radar) sensor.

In a case of a large vehicle on left/right lanes (e.g., a dangerous area in terms of determination and control) on the sides of a host vehicle, due to an FCL and a field of view (FOV), only a portion from a center point of a front bumper of the large vehicle to a part cut off by the FOV may be recognized.

For example, when a large vehicle overtakes a host vehicle at a speed less than approximately 40 kilometers per hour (kph) from the side of the host vehicle, a corner radar (CR) track may have split into two or more different tracks. This may occur due to a CR limitation that may be caused by a trade-off issue in which different vehicles are merged in such a low-speed situation.

In a real situation, a large vehicle may overtake a host vehicle from the side of the host vehicle, and a dynamic object fusion (DOF) track may be split and output into two or more different tracks.

SUMMARY

To solve the technical issues described above, an object of the present disclosure is to provide a vehicle including a sensor information fusion device, and an absorption and merging method using the sensor information fusion device, that may prevent an issue that a dynamic object fusion (DOF) track is split and output into two or more different tracks when a large vehicle passes a host vehicle from the side of the host vehicle.

The technical issues to be solved by the present disclosure are not limited to what has been described above, and other technical issues not described herein may be clearly understood by one of ordinary skill in the art from the following description.

According to an embodiment of the present disclosure, a vehicle is provided. The vehicle includes a sensing device including one or more sensors configured to obtain information on a target object present around the vehicle. The vehicle also includes a sensor information fusion device including a processor configured to generate or maintain a sensor fusion track using the information on the target object provided by the sensing device. The processor is configured to generate one or more tracks using the information on the target object provided by the one or more sensors, determine a similarity between the generated one or more tracks and generate the sensor fusion track, and manage the generated sensor fusion track.

In an aspect, the processor may be configured to assign an identifier (ID) and an age of a dynamic object fusion (DOF) track to identify the DOF track in the sensor fusion track. The Processor may also be configured to update the age of the DOF track to maintain the DOF track. The processor may further be configured to, when the DOF track satisfies a coasting age, control the DOF track to disappear.

In an aspect, the age of the DOF track may increase as the updating is performed.

In an aspect, the processor may be configured to convert the DOF track to a coasting DOF track when the coasting age is satisfied. The processor may also be configured to delete the coasting DOF track when the coasting age reaches a preset specific value.

In an aspect, the processor may be configured to, in response to two different DOF tracks overlapping each other, of the two different DOF tracks that are different in a longitudinal direction, use a DOF track having a smaller longitudinal position when a specific condition is satisfied.

In an aspect, the processor may be configured to in response to the two different DOF tracks overlapping each other, add a size of a length of the other remaining DOF track, among the two different DOF tracks, to the longitudinal position of the DOF track with the smaller longitudinal position and output a result therefrom as a single DOF track.

In an aspect, a condition for entry into absorbing and merging the two different DOF tracks may be satisfied when indices of the two different DOF tracks are different, respective IDs of the two different DOF tracks are valid, a status of the DOF tracks is not an initial value, and the two different DOF tracks correspond to the vehicle.

In an aspect, a condition for application of absorbing and merging the two different DOF tracks may be satisfied when an overlapping area of the two different DOF tracks is greater than 0.1 square meters, a longitudinal position of each of the two different DOF tracks is less than 6 meters (m), respective horizontal positions of the two different DOF tracks are left/right side lanes, a difference in horizontal position between the two different DOF tracks is less than 0.7 m, a longitudinal position of a DOF track to be absorbed of the two different DOF tracks is greater than a longitudinal position of an absorbing DOF track of the two different DOF tracks, a difference between a longitudinal position of a center point of a front bumper of a corner radar (CR) track of one of the two different DOF tracks and a longitudinal position of a center point of a rear bumper of the CR track of the other of the two different DOF tracks is within 2 m, a difference between the longitudinal position of the center point of the front bumper of the CR track of one of the two different DOF tracks and a longitudinal position of a center point of the rear bumper of a front corner lidar (FCL) track of the other of the two different DOF track is within 1.3 m, and a CR is included in each of the two different DOF tracks, an FCL is included in each of the two different DOF tracks, or an FCL is only in the DOF track to be absorbed.

In an aspect, a condition for execution of absorbing and merging the two different DOF tracks may be satisfied when the absorbing and merging have been completed on the two different DOF tracks, a length of the DOF track to be absorbed is added to an absolute value of a difference in longitudinal position between the two different DOF tracks, the FCL is not present in the absorbing DOF track of the two different DOF tracks, and the FCL is present in the DOF track to be absorbed of the two different DOF tracks, in the presence of the FCL in both the two different DOF tracks, a length of the FCL in the absorbing DOF track is smaller than a length of the FCL in the DOF track to be absorbed, and a longitudinal position of the DOF track on which the absorbing and merging have been completed is set to a longitudinal position of the absorbing DOF track.

In an aspect, the processor may be configured to, when the absorbing and merging have been completed on the two different DOF tracks, delete the DOF track, among the two different DOF tracks, that has been absorbed and merged.

According to another embodiment of the present disclosure, a method for absorbing and merging sensor fusion tracks using a sensor information fusion device of a vehicle is provided. The method includes generating, by a processor of the sensor information fusion device, one or more tracks using information on a target object around the vehicle, the information provided by the one or more sensors. The method also includes determining, by the processor, a similarity between the generated one or more tracks. The method further includes generating, by the processor, the sensor fusion track. The method additionally includes managing, by the processor, the generated sensor fusion track.

In an aspect, the method may further include assigning, by the processor, an ID and an age a DOF track to identify the DOF track in the sensor fusion track. The method may further still includes updating, by the processor, the age of the DOF track to maintain the DOF track. The method may additionally include, when the DOF track satisfies a coasting age, controlling, by the processor, the DOF track to disappear.

In an aspect, the age of the DOF track may increase as the updating is performed.

In an aspect, when the coasting age is satisfied, the DOF track may be converted to a coasting DOF track, and when the coasting age reaches a preset specific value, the coasting DOF track may be deleted.

In an aspect, the method may include, in response to two different DOF tracks overlapping each other, of the two different DOF tracks that are different in a longitudinal direction, using, by the processor, a DOF track having a smaller longitudinal position when a specific condition is satisfied.

In an aspect, the method may include, in response to the two different DOF tracks overlapping each other, adding, by the processor, a size of a length of the other remaining DOF track, among the two different DOF tracks, to the longitudinal position of the DOF track with the smaller longitudinal position and outputting a result therefrom as a single DOF track.

In an aspect, a condition for entry into absorbing and merging the two different DOF tracks may be satisfied when indices of the two different DOF tracks are different, respective IDs of the two different DOF tracks are valid, a status of the DOF tracks is not an initial value, and the two different DOF tracks correspond to the vehicle.

In an aspect, a condition for application of absorbing and merging the two different DOF tracks may be satisfied when an overlapping area of the two different DOF tracks is greater than 0.1 square meters, a longitudinal position of each of the two different DOF tracks is less than 6 meters (m), respective horizontal positions of the two different DOF tracks are left/right side lanes, a difference in horizontal position between the two different DOF tracks is less than 0.7 m, a longitudinal position of a DOF track to be absorbed of the two different DOF tracks is greater than a longitudinal position of an absorbing DOF track of the two different DOF tracks, a difference between a longitudinal position of a center point of a front bumper of a CR track of one of the two different DOF tracks and a longitudinal position of a center point of a rear bumper of the CR track of the other of the two different DOF tracks is within 2 m, a difference between the longitudinal position of the center point of the front bumper of the CR track of one of the two different DOF tracks and a longitudinal position of a center point of the rear bumper of an FCL track of the other of the two different DOF track is within 1.3 m, and a CR is included in each of the two different DOF tracks, an FCL is included in each of the two different DOF tracks, or an FCL is only in the DOF track to be absorbed.

In an aspect, a condition for execution of absorbing and merging the two different DOF tracks may be satisfied when the absorbing and merging have been completed on the two different DOF tracks, a length of the DOF track to be absorbed is added to an absolute value of a difference in longitudinal position between the two different DOF tracks, the FCL is not present in the absorbing DOF track of the two different DOF tracks, and the FCL is present in the DOF track to be absorbed of the two different DOF tracks, in the presence of the FCL in both the two different DOF tracks, a length of the FCL in the absorbing DOF track is smaller than a length of the FCL in the DOF track to be absorbed, and a longitudinal position of the DOF track on which the absorbing and merging have been completed is set to a longitudinal position of the absorbing DOF track.

In an aspect, the method may include, when the absorbing and merging have been completed on the two different DOF tracks, deleting, by the processor, a DOF track, among the two different DOF tracks, that has been absorbed and merged.

According to various embodiments of the present disclosure, a vehicle including a sensor information fusion device, and an absorption and merging method using the same, may prevent an issue that, when a large vehicle passes a host vehicle from the side of the host vehicle, a DOF track is split and output into two or more different tracks.

The effects obtained from the present disclosure are not limited to those described above, and other effects not described should be apparent to those having ordinary skill in the art to which the present disclosure pertains from the following description.

BRIEF DESCRIPTION OF THE DRAWINGS

The above and other objects, features and advantages of the present disclosure should be more apparent from the following detailed description taken in conjunction with the accompanying drawings, in which.

DETAILED DESCRIPTION

Figure 1:
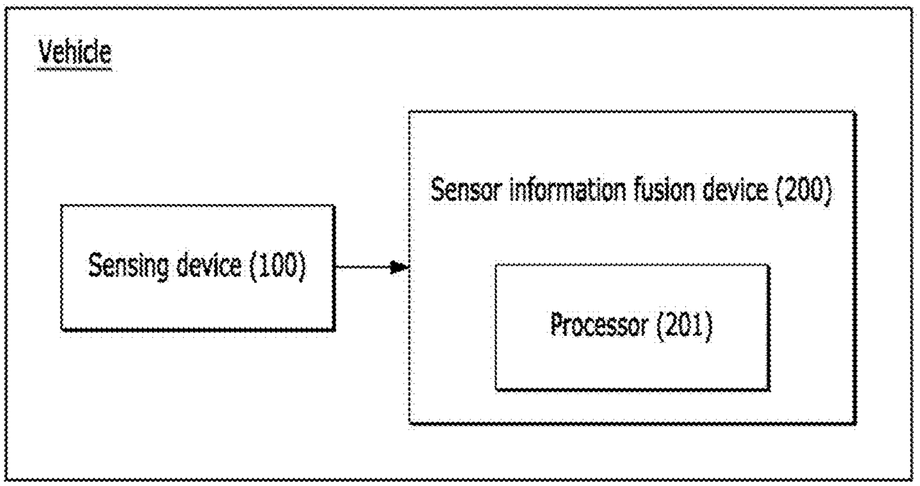
FIG. 1 is a diagram illustrating a vehicle including a sensor information fusion device according to an embodiment.

Hereinafter, embodiments of the present disclosure are described in detail with reference to the accompanying drawings. In the following description, the same or similar elements have been given the same reference numerals regardless of reference symbols, and redundant description thereof have been omitted.

The terms "module," "unit," and/or "-er/or" for referring to elements are assigned and used interchangeably in consideration of the convenience of description, and thus the terms per se do not necessarily have different meanings or functions. The terms "module," "unit," and/or "-er/or" do not necessarily require physical separation. For example, "00 module, unit, and/or -er/or" and "XX module, unit, and/or—er/or" may be components that perform different functions, but may not be physically separated but may perform the functions in parallel or in sequential order in the same microprocessor.

Further, in the following description, when it is determined that a detailed description of related publicly known technology may obscure the gist of the embodiments described herein, the detailed description thereof has been omitted.

The accompanying drawings are used to illustrate various technical features. It should be understood that the embodiments described herein are not limited by the accompanying drawings. The present disclosure should be construed as extending to any alterations, equivalents, and substitutes, in addition to those that are particularly set out in the accompanying drawings.

Although terms including ordinal numbers, such as "first, " "second," and the like, may be used herein to describe various elements, the elements are not limited by these terms. These terms are only used to distinguish one element from another.

In the description of the embodiments, when an element is described as being formed "on" or "under" another element, it may be construed that the two elements are in direct contact, or the two elements are in indirect contact with one or more other elements disposed therebetween.

For example, "B present (or disposed, positioned, or located) on A" may only indicate that B is shown on or above A in the accompanying drawings, unless otherwise stated or when B needs to be located above A due to the nature of A or B. In an actual product, B may be located under/below A, or B and A may be disposed side-by-side.

The term "and/or" is used to include any combination of multiple items that are subject to it. For example, "A and/or B" may include all three cases, for example, "A," "B," and "A and B."

When an element is described as being "coupled" or "connected" to another element, the element may be directly coupled or connected to the other element. However, it should be understood that another element may be present therebetween. In contrast, when an element is described as being "directly coupled" or "directly connected" to another element, it should be understood that there are no other elements therebetween.

The singular forms "a," "an," and "the" are intended to include the plural forms as well, unless the context clearly indicates otherwise.

It should be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms including technical and scientific terms used herein have the same meaning as commonly understood by one of ordinary skill in the art to which the present disclosure pertains. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

In addition, the term "unit" or "control unit" is merely a widely used term for naming a controller that controls a specific vehicle function, and does not mean a generic functional unit. For example, each controller may include a communication device that communicates with another controller or a sensor to control a function assigned thereto, a memory that stores an operating system (OS), a logic command, input/output information, and the like, and one or more processors that perform determination, calculation, decision, and the like that are necessary for controlling a function assigned thereto.

When a component, device, element, or the like of the present disclosure is described as having a purpose or performing an operation, function, or the like, the component, device, or element should be considered herein as being "configured to" meet that purpose or perform that operation or function.

Hereinafter, operating principles and embodiments of the present disclosure are described with reference to the accompanying drawings.

FIG. 1 is a diagram illustrating a vehicle including a sensor information fusion device, according to an embodiment.

Referring to FIG. 1, a vehicle may include a sensing device 100 configured to detect an object present outside. The vehicle may also include a sensor information fusion device 200 configured to fuse sensor information obtained from the sensing device 100 and recognize the object.

The sensing device 100 may include one or more sensors configured to obtain information on a target object present around the vehicle. The sensing device 100 may obtain at least one set of information, such as, for example, a position, a moving speed, a moving direction, and a type (e.g., vehicle, pedestrian, bicycle, motorcycle, etc.) of the target object, according to a type of sensor.

The sensing device 100 may include various sensors, as non-limiting examples, an ultrasonic sensor, a radio detection and ranging (radar), a camera, a laser scanner, a light detection and ranging (lidar), and a near vehicle detection (NVD). For example, the sensing device 100 may include SF (FC, FR, CR fusion track) sensor fusion, a front side lidar, NVD, rear side image recognition (RSIR), and the like. However, examples of the sensing device 100 are not limited thereto.

The sensor information fusion device 200 may include a processor 201. The processor 201 may control overall operation of the sensor information fusion device 200.

The processor 201 may control the sensor information fusion device 200 to perform filtering through a validity check to select only a sensor track that is suitable to be used for sensor fusion, to determine the same object between heterogeneous sensors to generate and maintain a sensor fusion track and apply a physical sensor value, to assign an identifier (ID) to the sensor fusion track, to process the sensor fusion track, and to set whether to delete the sensor fusion track, and the like. The processor 201 is described in more detail below.

Figure 2:
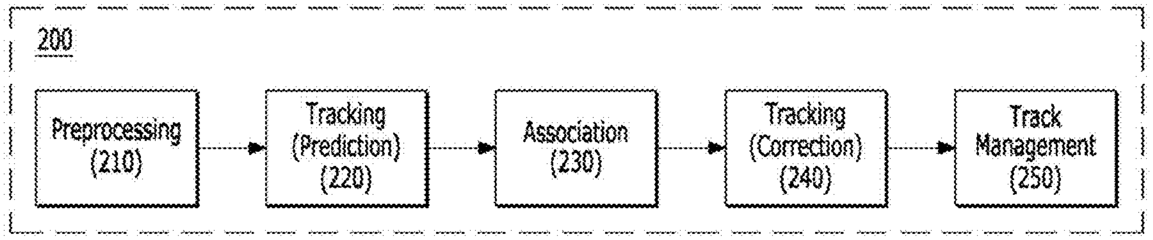
FIG. 2 is a schematic block diagram illustrating a configuration of a sensor information fusion device according to an embodiment.

FIG. 2 is a schematic block diagram illustrating a configuration of a sensor information fusion device, according to an embodiment.

Referring to FIG. 2, the processor 201 may include a preprocessing unit 210, a predicted track generation unit 220, an association unit 230, a fusion track output unit 240, and a fusion track management unit 250. The preprocessing unit 210, the predicted track generation unit 220, the association unit 230, the fusion track output unit 240, and the fusion track management unit 250 may each operate under the control of the processor 201.

The preprocessing unit 210 may generate one or more tracks using information output from one or more sensors. The preprocessing unit 210 may perform primary filtering on sensor tracks used for dynamic object fusion (DOF) through a validity check (e.g., field of view (FOV), confidence Lv, class, etc.) performed on the generated tracks. The information output from the sensors may be in the form of a rectangle or box that includes a width and a length.

The predicted track generation unit 220 may be a module configured to compensate for 50 ms based on a constant velocity model. For example, the predicted track generation unit 220 may correspond to prediction of a Kalman filter.

The association unit 230 may determine a similarity between the tracks generated by the sensors and fuse them into a single fusion track. For example, the association unit 230 may update a sensor fusion track that is an association target among the tracks of the one or more sensors. In an embodiment, the association unit 230 may determine the same object in a fusion sensor or among heterogeneous sensors to generate and maintain the sensor fusion track and apply a physical sensor value. The sensor fusion track may include a dynamic object fusion (DOF) track.

The fusion track output unit 240 may output the sensor fusion track generated by the association unit 230. The fusion track output unit 240 may correspond to correction of a Kalman filter, for example.

The fusion track management unit 250 may assign an ID to the generated or corrected sensor fusion track and process the sensor fusion track. The fusion track management unit 250 may select whether to delete the generated sensor fusion track based on a predetermined criterion. This is described in more detail below with reference to FIG. 3.

Figure 3:
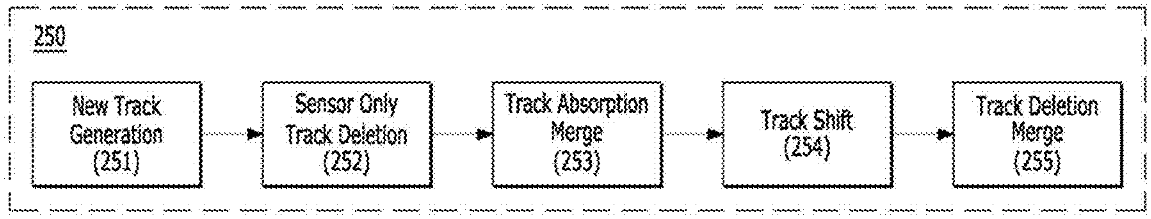
FIG. 3 is a schematic block diagram illustrating a configuration of a fusion track management unit according to an embodiment.

FIG. 3 is a schematic block diagram illustrating a configuration of a fusion track management unit, according to an embodiment.

Referring to FIG. 3, the fusion track management unit 250 may include a new track generation module 251, a sensor-only track deletion module 252, a track absorption merge module 253, a track shift module 254, and a track deletion merge module 255.

The new track generation module 251 may identify, maintain, or destroy a generated DOF track.

For example, the new track generation module 251 may assign an ID, an age, and the like of the DOF track to identify the DOF track in the generated sensor fusion track and may update the age of the DOF track to maintain the DOF track. In this case, when a coasting age is satisfied, the new track generation module 251 may control the DOF track to disappear.

The age of the DOF track may refer to a total time after the DOF track is generated. The age of the DOF track may be defined by how old it is.

The age of the DOF track may increase as the age of the DOF track is updated. The DOF track with a greater age may become a track with greater confidence. Thus, the age of the DOF track being high may indicate that tracking of the DOF track continues steadily.

In addition, when the DOF track satisfies the coasting age, the DOF track may become a coasting DOF track. The coasting DOF track may refer to a track in a state where there is no sensor combination as sensors are not recognized. The coasting DOF track with the sensors not recognized may have a low confidence. Accordingly, when the coasting age updated in each loop of a DOF logic reaches a preset specific value, the new track generation module 251 may delete the coasting DOF track.

The sensor-only track deletion module 252 may delete a DOF track by a sensor alone.

The track absorption merge module 253 may, when two different DOF tracks overlap, use a longitudinal position of a DOF track smaller in a longitudinal direction when a specific condition is satisfied. In a case of an issue situation or an event situation where, for example, a target vehicle overtakes a host vehicle, the smaller longitudinal position may be similar to a real one.

In addition, the track absorption merge module 253 may be provided to maintain the ID of the DOF track generated by the new track generation module 251. This is because it may be required to maintain an ID of DOF tracks for the same target.

In addition, for a length, the track absorption merge module 253 may absorb lengths of two different DOF tracks and output them as a single DOF track.

For example, when a length of a first DOF track (DOF1) and a length of a second DOF track (DOF2) that are different from each other overlap, a value obtained by adding a size of the length of the second DOF track DOF2 to an absolute value of a difference in longitudinal position between the first DOF track DOF1 and the second DOF track DOF2 may be used.

The track absorption merge module 253, according to an embodiment, is described in more detail below.

The track shift module 254 may process the DOF track using an associated lidar.

When two different DOF tracks are output for the same target due to inaccuracy of the sensors or inaccurate information of the sensors, the track deletion merge module 255 may compare and analyze the two different DOF tracks and delete one of the DOF tracks based on a resulting value obtained by the comparing and analyzing.

For example, the track deletion merge module 255 may delete a DOF track having a low confidence between the two output DOF tracks.

Figure 4:
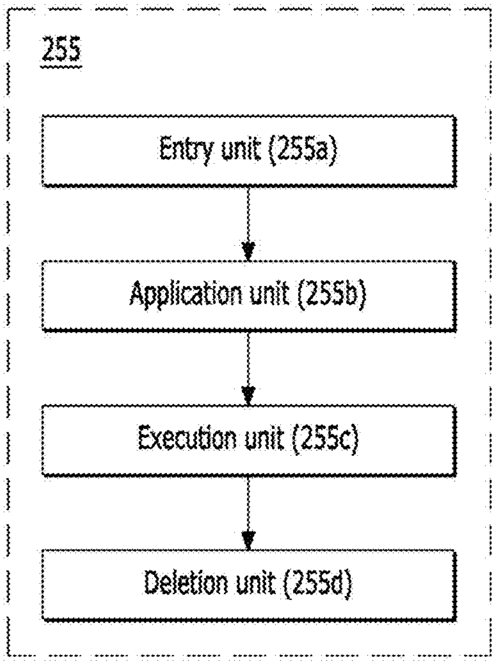
FIG. 4 is a schematic block diagram illustrating a configuration of a track absorption merge module according to an embodiment.
Figure 5:
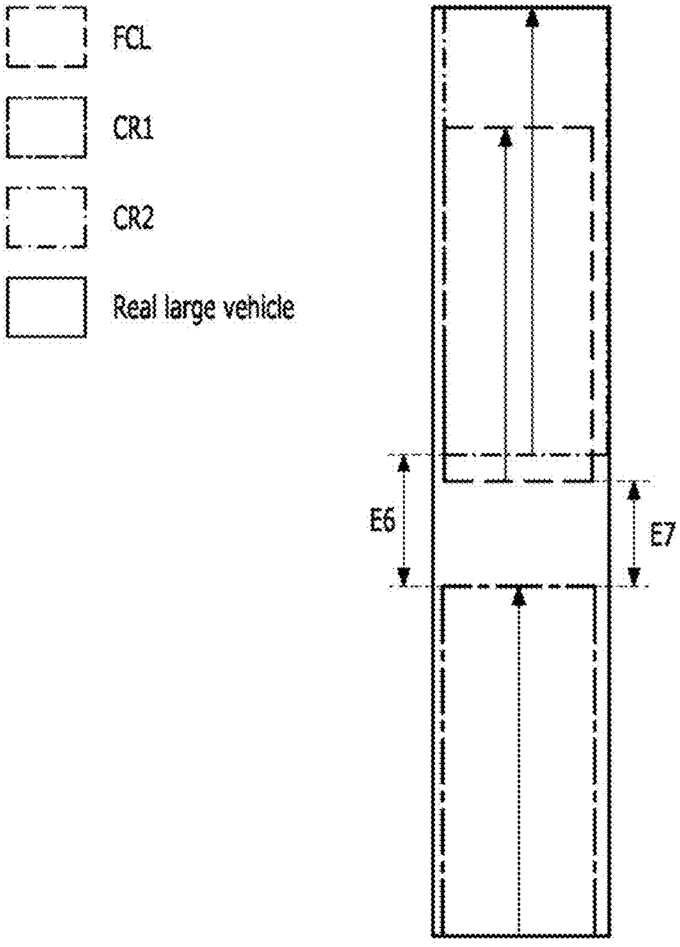
FIGS. 5 and 6 are diagrams illustrating examples of an operation of a track absorption merge module according to an embodiment.
Figure 6:
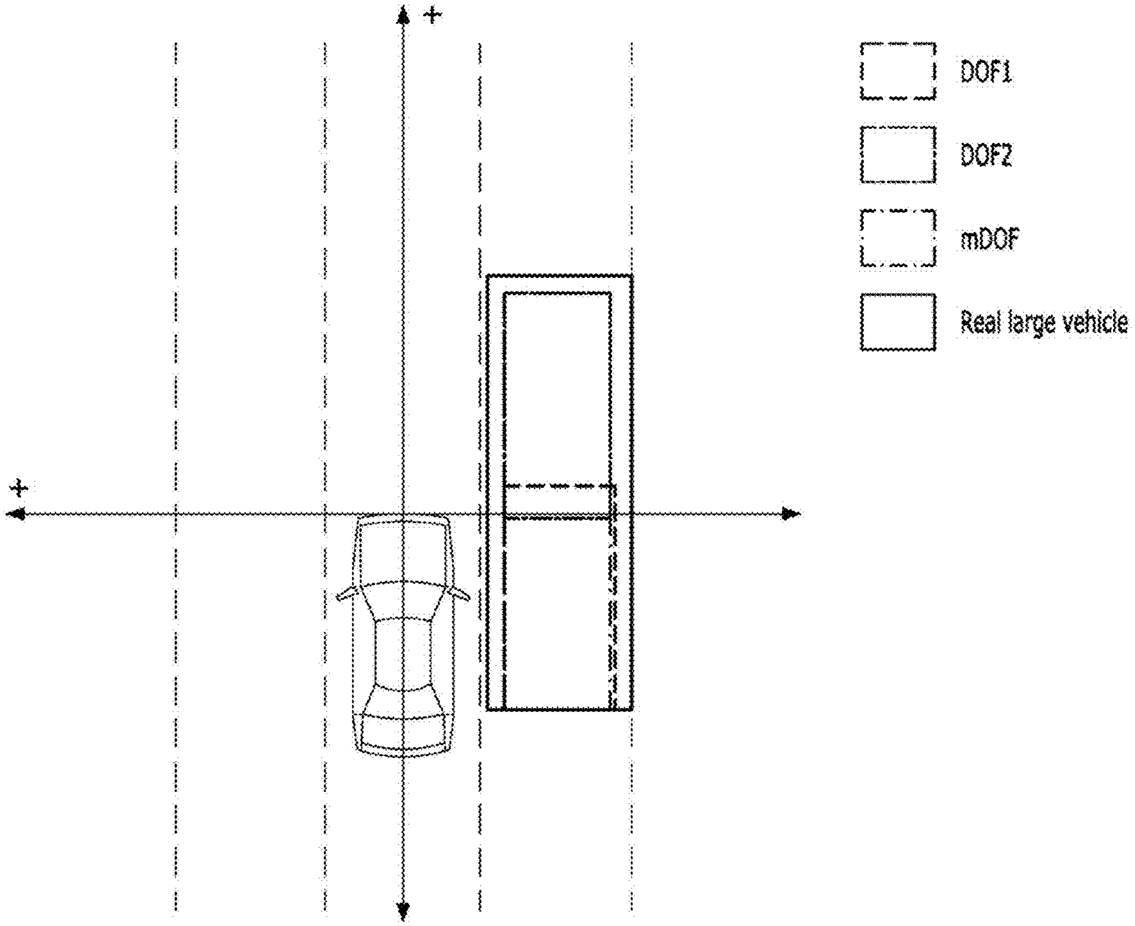

FIG. 4 is a schematic block diagram illustrating a configuration of a track absorption merge module, according to an embodiment. FIGS. 5 and 6 are diagrams illustrating examples of an operation of a track absorption merge module, according to an embodiment.

Referring to FIG. 4, the track absorption merge module 255 may include an entry unit 255*a*, an application unit 255*b*, an execution unit 255*c*, and a deletion unit 255*d*.

The entry unit 255*a* may enter track absorption and merging under the control of the processor 201. In embodiments, conditions for entry into absorption and merging are as follows.

1) A condition for entry into absorption and merging may be satisfied when there are different indices of two different DOF tracks. This is because absorption and merging need to be applied only to different DOF tracks. For example, the two different DOF tracks may include a first DOF track and a second DOF track. In this example, a DOF track assigned to index 1 (Index1), which is an absorbing DOF track, is defined as the first DOF track or DOF1. In addition, a DOF track assigned to index 2 (Index2), which is a DOF track to be absorbed, is defined as the second DOF track or DOF2.
2) A condition for entry into absorption and merging may be satisfied when the IDs of the two different DOF tracks are valid. In a case of an invalid DOF track, there may be a fault, a false, or an error, and it is thus possible to check whether a track is an actual valid DOF track.
3) A condition for entry into absorption and merging may be satisfied when a track status of index 1 is not an initial value. In other words, the track status may be a status excluding the initial value of the track status. For example, an initially generated (new) DOF track, an updated DOF track, and a coasted (measure-free) DOF track may be a target to be used, and only these may be used. In this example, the coasting DOF track may be a track without any sensor combination because sensors are not recognized. The coasting DOF track with the sensors not recognized may have a low confidence.
4) A condition for entry into absorption and merging may be satisfied when a DOF class of the two different DOF tracks corresponds to a vehicle. For example, absorption and merging may be applied only to vehicles among dynamic object targets, e.g., vehicles, PTWs, Cyc, and pedestrians.

The application unit 255*b* may apply the track absorption and merging under the control of the processor 201. In embodiments, conditions for application of the absorption and merging are as follows.

1) A condition for application of absorption and merging may be satisfied when an overlapping area of the DOF tracks is greater than 0.1 square meters. In such a case, it may be assumed that tuning parameter overlapping speeds are similar. For example, in a case in which the overlapping area of the DOF tracks is less than 0.1 square meters, there may be a high probability of occurrence of a trade-off in which two different vehicles are absorbed in a congested situation. To prevent this, the application unit 255*b* may set the overlapping area of the DOF tracks to 0.1 square meters or greater.
2) A condition for application of absorption and merging may be satisfied when a longitudinal position of each DOF track is less than 6 meters (m). Since absorption and merging may be applied to different vehicles, a conservative approach may be required. The application unit 255*b* may set the longitudinal position of each DOF track to less than 6 m to prevent an issue that may occur in an actual road monitoring situation.
3) A condition for application of absorption and merging may be satisfied when a horizontal position of each DOF track is on a left/right side lane. A side lane may be greater than 1.75 m and less than 5.25 m in the horizontal position based on an absolute value.
4) A condition for application of absorption and merging may be satisfied when a horizontal position difference between the DOF tracks is less than 0.7 m. For example, this may occur when the number of CR tracks to be split for a large vehicle is three, and thus in order not to apply the absorption and merging of CR tracks that are falsely expected, the application unit 255*b* may desirably set a horizontal position of each DOF track to be less than 0.7 m.
5) A condition for application of absorption and merging may be satisfied when a longitudinal position of a DOF track to be absorbed (e.g., DOF2) is greater than a longitudinal position of an absorbing DOF track (e.g., DOF1). In other words, the longitudinal position of the second DOF track may be greater than the longitudinal position of the first DOF track. This is to secure the maintenance of an ID of a DOF track.
6) A condition for application of absorption and merging may be satisfied when a difference between a longitudinal position of a center point of a front bumper of a CR track of the first DOF track DOF1 and a longitudinal position of a center point of a rear bumper of the CR track of the second DOF track DOF2 is within 2 m. In a case in which the difference between the longitudinal position of the center point of the front bumper of the CR track of the first DOF track DOF1 and the longitudinal position of the center point of the rear bumper of the CR track of the second DOF track DOF2 is 2 m or greater, there may be a high probability of occurrence of a trade-off in which two different vehicles are absorbed in a congested situation. To prevent this, the application unit 255*b* may desirably set a difference between a longitudinal position of a center point of a front bumper of CR1 track and a longitudinal position of a center point of a rear bumper of CR2 track to be within 2 m, as shown in E6 of FIG. 5.
7) A condition for application of absorption and merging may be satisfied when a difference between a longitudinal position of a center point of a front bumper of a CR track of the first DOF track DOF1 and a longitudinal position of a center point of a rear bumper of an FCL track of the second DOF track DOF2 is within 1.3 m. In a case in which the difference between the longitudinal position of the center point of the front bumper of the CR track of the first DOF track DOF1 and the longitudinal position of the center point of the rear bumper of the FCL track of the second DOF track DOF2 is 1.3 m or greater, there may be a high probability of occurrence of a trade-off in which two different vehicles are absorbed in a congested situation. To prevent this, the application unit 255*b* may desirably set a difference between a longitudinal position of a center point of a front bumper of a CR1 track of the first DOF track DOF1 and a longitudinal position of a center point of a rear bumper of an FCL track of the second DOF track DOF2 to be within 1.3 m, as shown in E7 of FIG. 5.
8) A condition for application of absorption and merging may be satisfied for a combination of DOF tracks. For example, the first DOF track and the second DOF track may each include a CR or may each include an FCL, or only the second DOF track DOF2 may include an FCL. For example, the FCL may be present in the second DOF track having a greater longitudinal position.

For example, the absorption and merging may operate in a situation where a target vehicle overtakes a host vehicle, and it may thus indicate that an FCL is associated with a DOF track having a greater longitudinal position in a boundary area of the host vehicle.

9) A condition for application of absorption and merging may be satisfied when a length of a DOF track is not processed by the association unit 230. This is because the length of the DOF track may be prevented from becoming larger unintentionally.

The application unit 255*b* may apply the track absorption and merging when all the forgoing conditions for the application of the absorption and merging are satisfied. This is because a trade-off issue may be solved only when longitudinal positions of center points of front/rear bumpers of sensors associated with two different DOF tracks are within a preset range (e.g., threshold).

As described above, strengthening the conditions for the application of the absorption and merging may prevent a merging operation from being performed when the absorption and merging is not required.

The execution unit 255*c* may perform the track absorption and merging under the control of the processor 201. Referring to FIG. 6, in embodiments, conditions for execution of the absorption and merging are as follows.

1) A condition for execution of the absorption and merging may be satisfied for an mDOF combination. An mDOF is defined as a DOF track on which the absorption and merging have been completed. The first DOF track DOF1 is defined as an absorbing DOF track. An mDOF may indicate a sensor combination of DOF tracks on which the absorption and merging have been completed. The second DOF track DOF2 is defined as a DOF track to be absorbed.

In this case, for a sensor that is not present in the first DOF track DOF1 but is present in the second DOF track DOF2, it may be brought to the first DOF track DOF1. For example, when there is a CR in the first DOF track DOF1, and a CR and an FCL in the second DOF track DOF2, it is possible to bring the FCL in the second DOF track DOF2 to the first DOF track DOF1.

2) A condition for execution of the absorption and merging may be satisfied when a length of the mDOF is a sum of a length of the second DOF track DOF2 and an absolute value of a difference in longitudinal position between the first DOF track DOF1 and the second DOF track DOF2.

This is because there is an overlapping area between the first DOF track DOF1 and the second DOF track DOF2, and thus a value obtained by adding the length of the second DOF track DOF2 to the absolute value of the longitudinal position difference between the first DOF track DOF1 and the second DOF track DOF2 may be used.

3) In a case of a horizontal position, a width, and a heading angle of an mDOF, it is possible to use a signal of the second DOF track DOF2 when the following conditions are satisfied.

Condition 1 is that an FCL is not present in the first DOF track DOF1 but present in the second DOF track DOF2. Condition 2 is that an FCL is present in both the first DOF track DOF1 and the second DOF track DOF2 and a length of the FCL present in the second DOF track DOF2 is greater than a length of the FCL present in the first DOF track DOF1.

This is because, for example, for a large vehicle, an FCL track having a greater length signal may have a higher confidence. This is to use a horizontal position, a width, and a heading angle of a lidar, and, when a lidar is present in both the first DOF track DOF1 and the second DOF track DOF2, a lidar having a greater confidence may be obtained.

4) A condition for execution of the absorption and merging may be satisfied when a longitudinal position of an mDOF is set to a longitudinal position of the first DOF track DOF1. This is because, for example, the longitudinal position of the first DOF track DOF1 is less than that of the second DOF track DOF2. This may occur, for example, in a situation where a target vehicle overtakes a host vehicle.

The deletion unit 255*d* may delete tracks that have been absorbed and merged under the control of the processor 201. For example, the deletion unit 255*d* may delete the second DOF track DOF2 by initializing a signal of the second DOF track DOF2 that has been absorbed and merged.

Examples of actual applications of the vehicle including the sensor information fusion device described above according to various embodiments of the present disclosure to real roads are as follows.

FIGS. 7-17 show actual simulation results measured while a vehicle including a sensor information fusion device is traveling on a real road according to embodiments.

One of the important factors in terms of recognition in a highway driving pilot (HDP) function may be the accuracy of shapes and positions of vehicles traveling on left/right side lanes.

A white box indicates DOF, a green box indicates FCL, and a purple box indicates CR only SF.

Figure 7:
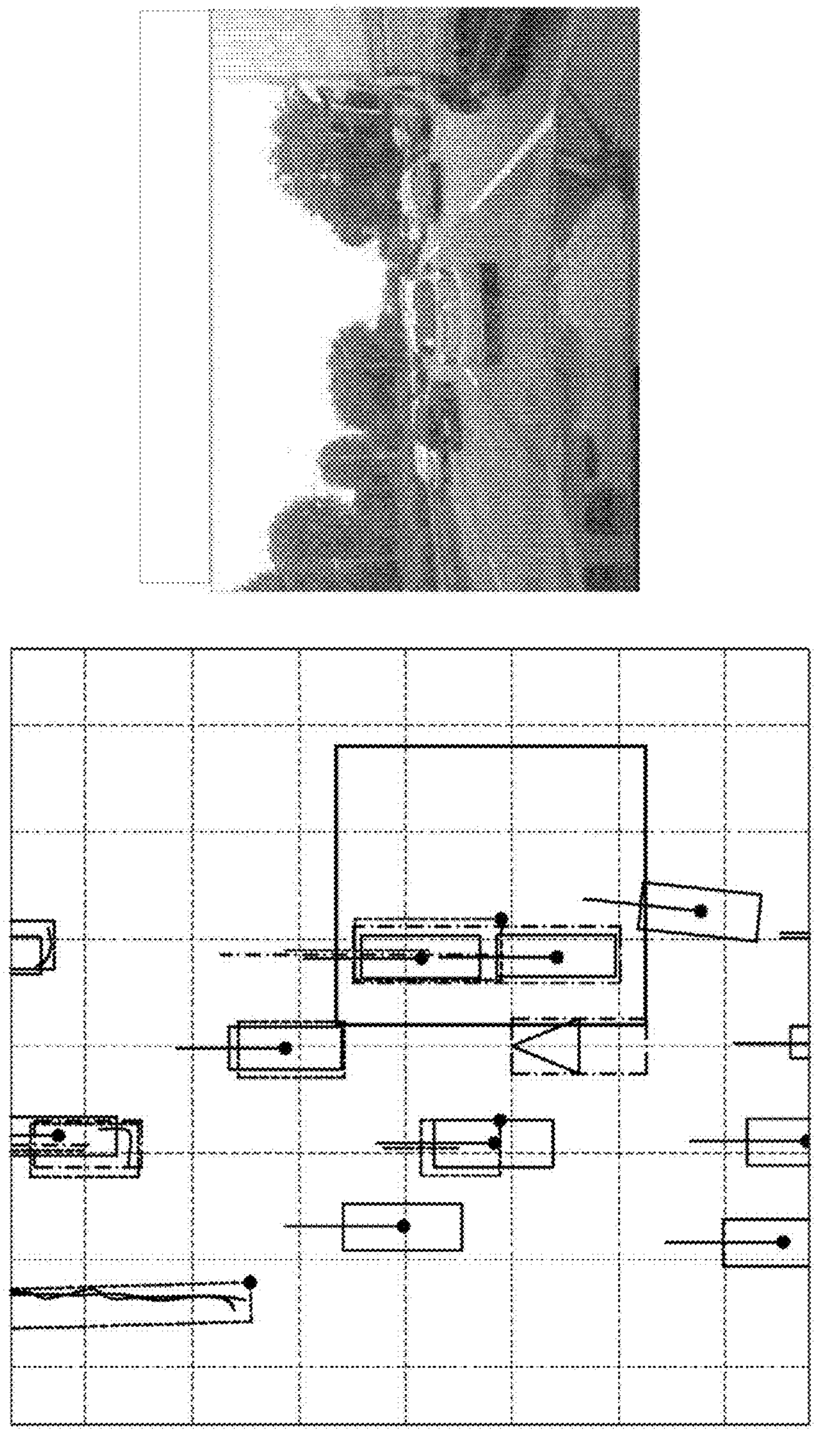
FIGS. 7-17 show actual simulation results measured while a vehicle including a sensor information fusion device is traveling on a real road according to embodiments.
Figure 8:
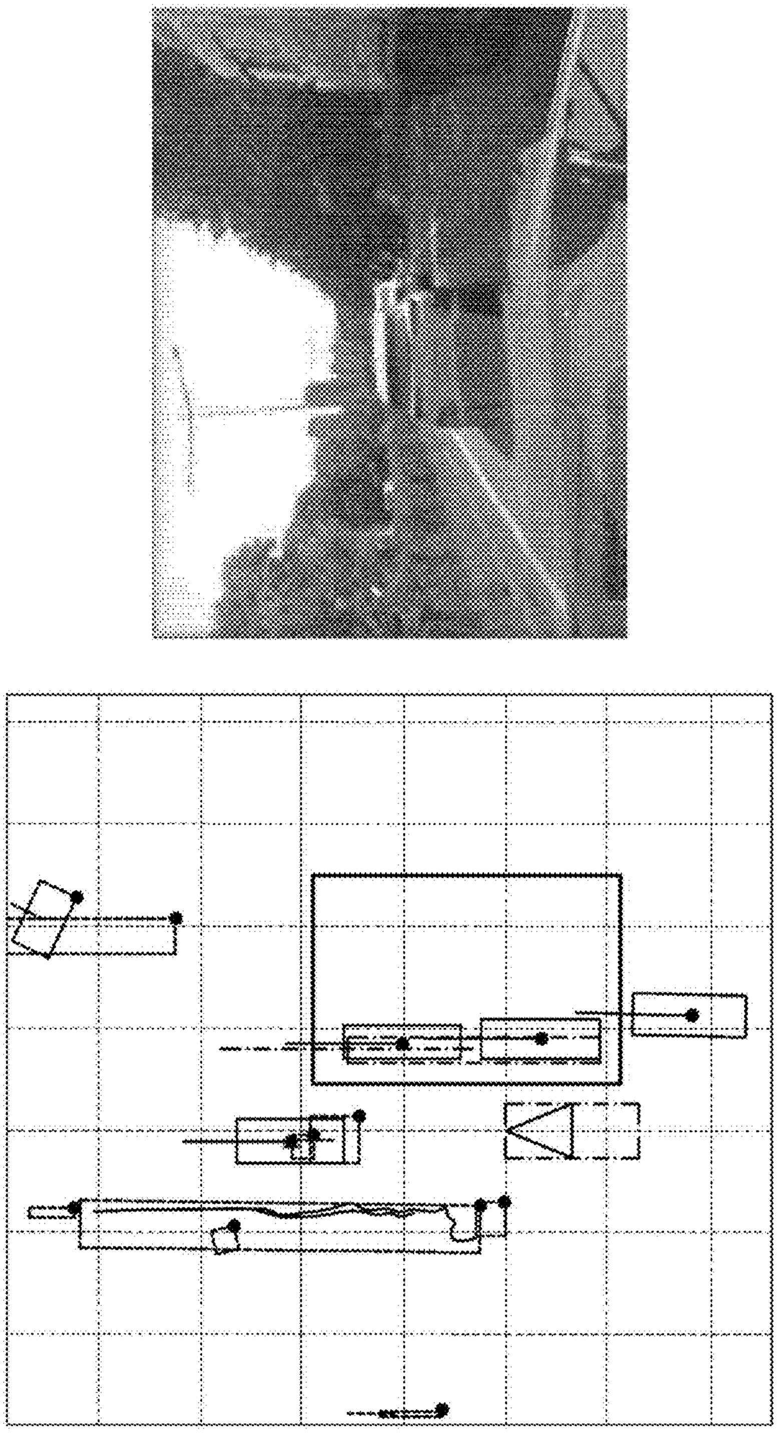

FIGS. 7 and 8 show actual simulation results of solving an issue occurring in a situation where a large vehicle overtakes a host vehicle from the side of the host vehicle.

As shown in FIGS. 7 and 8, the sensor information fusion device 200 according to an embodiment of the present disclosure may solve an issue that the large vehicle is split on the side of the host vehicle. When an embodiment of the present disclosure is applied, such a split issue may be solved as shown in the actual simulation result.

For a large vehicle on a right lane of the host vehicle, a CR only SF track may be output as two different tracks, and in a case of an FCL track, a longitudinal position may be inaccurate.

In a situation where the issue occurs, two DOF tracks (FCL+SF, SF alone) are output. In such a case, by applying the absorption and merging, one DOF track with accurate longitudinal position and shape may be output.

FIGS. 9 to 12 show actual simulation results of establishing conditions for the absorption and merging.

Figure 9:
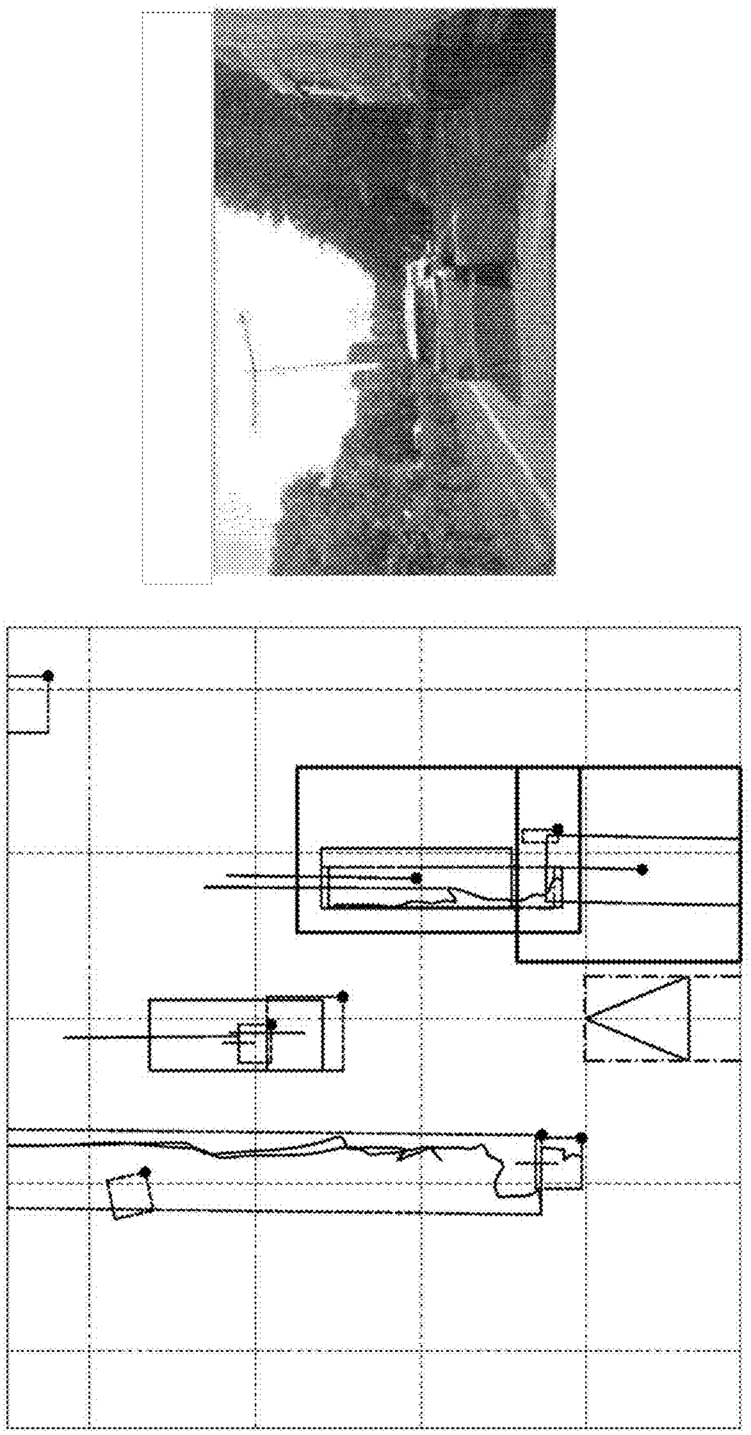
Figure 10:
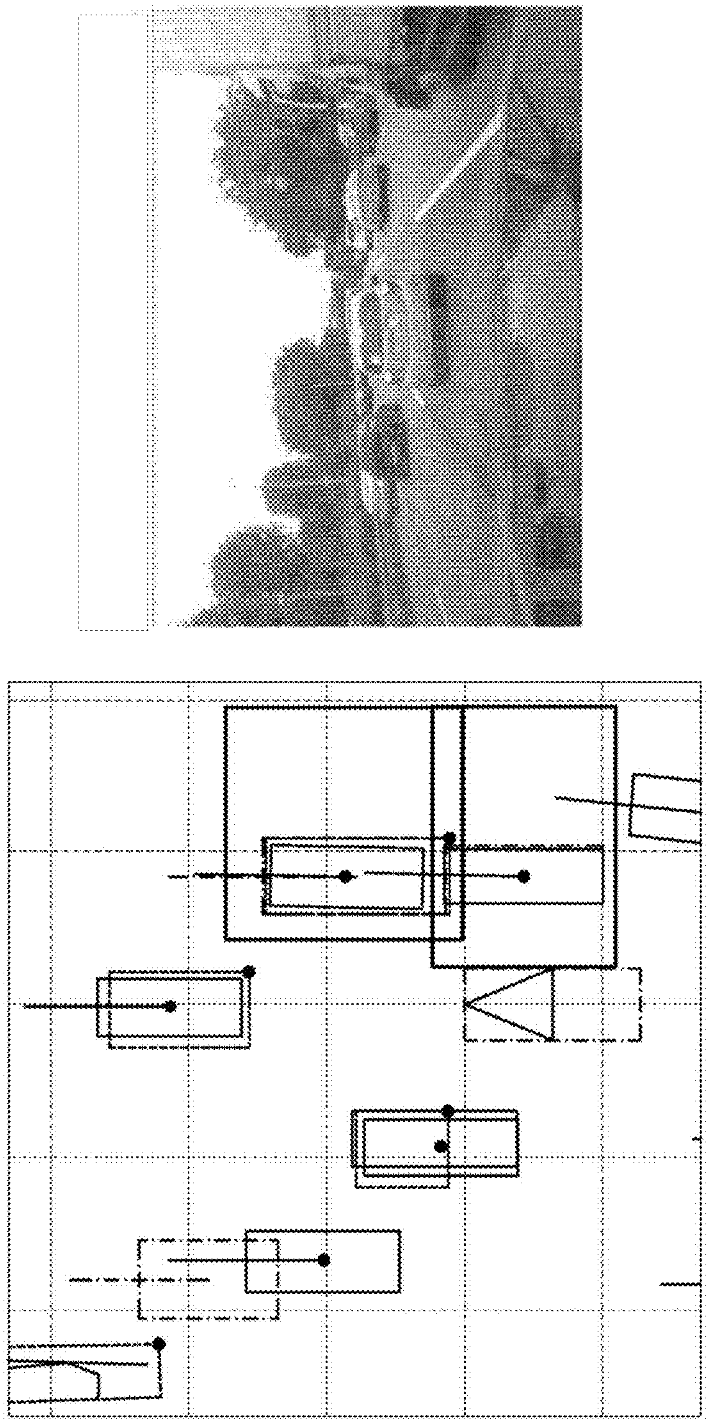

As shown in FIGS. 9 and 10, when a split issue occurs in a DOF track (white box) for a large vehicle on the right side of a host vehicle, conditions for applying the absorption and merging may be established as follows.

For example, different DOF tracks may need to overlap (it may be verified that more than 0.1 square meters is selected through various trials and errors, for example).

A horizontal position may need to be applied when a target vehicle overtakes a host vehicle from a left/right lane of the host vehicle, and thus conditions for the left/right lane may be established. In addition, in a case of a longitudinal position, the conditions may be established through trials and errors.

Figure 11:
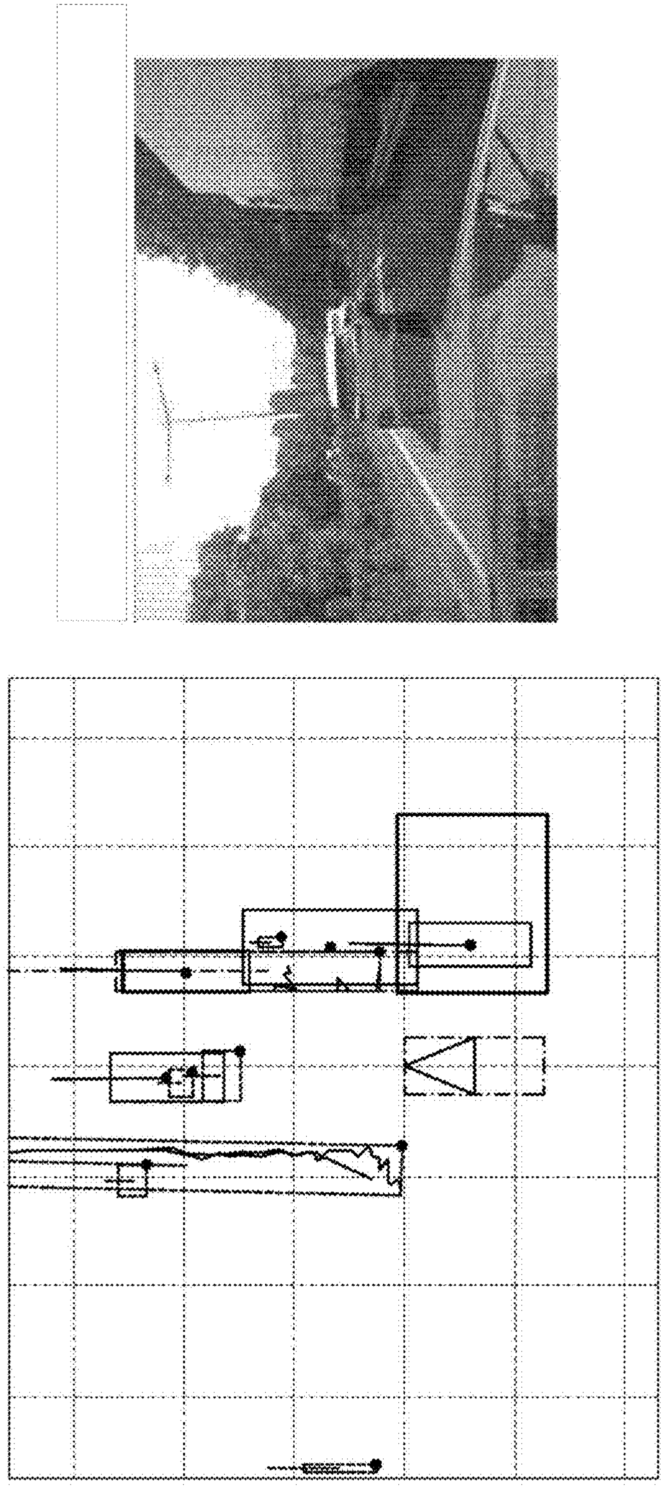
Figure 12:
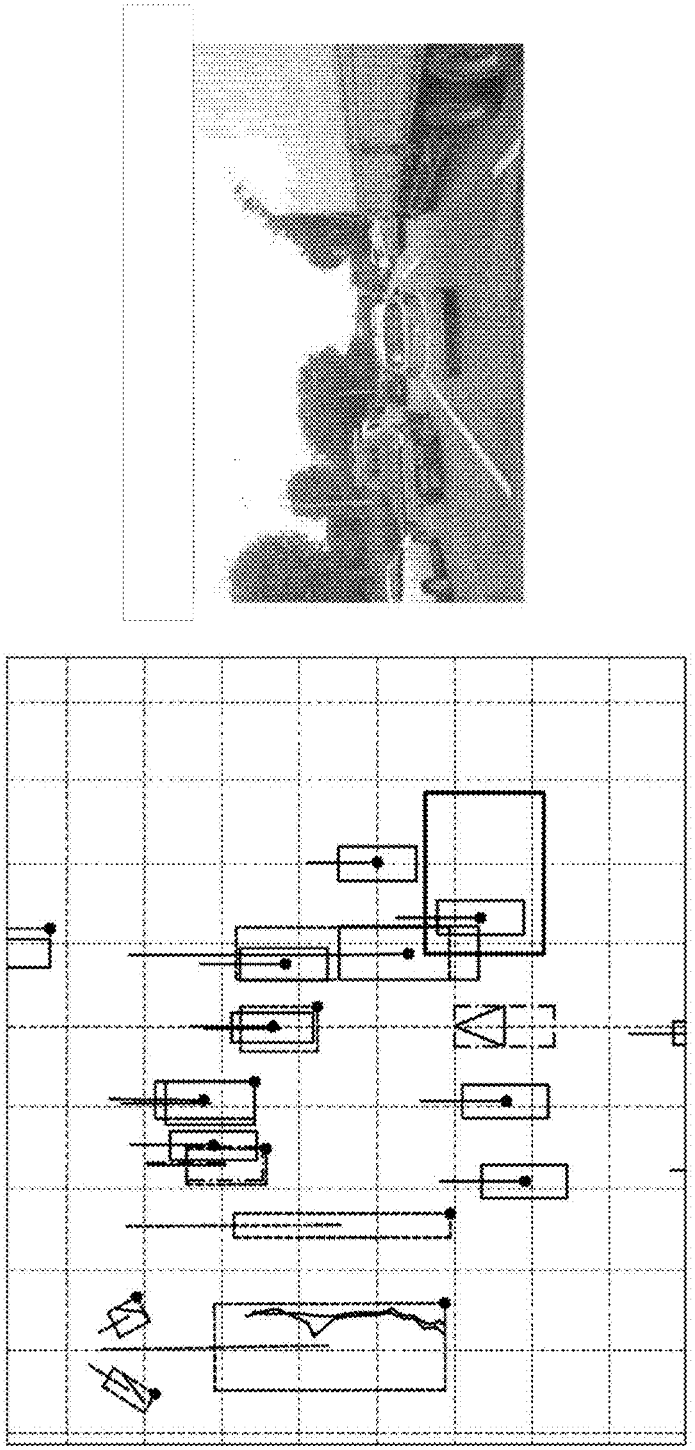

Unlike this, as shown in FIGS. 11 and 12, when a false CR track occurs for a large vehicle, this track should not be absorbed. Therefore, a condition of setting a horizontal position difference between different DOF tracks to 0.7 m may be selected.

Figure 13:
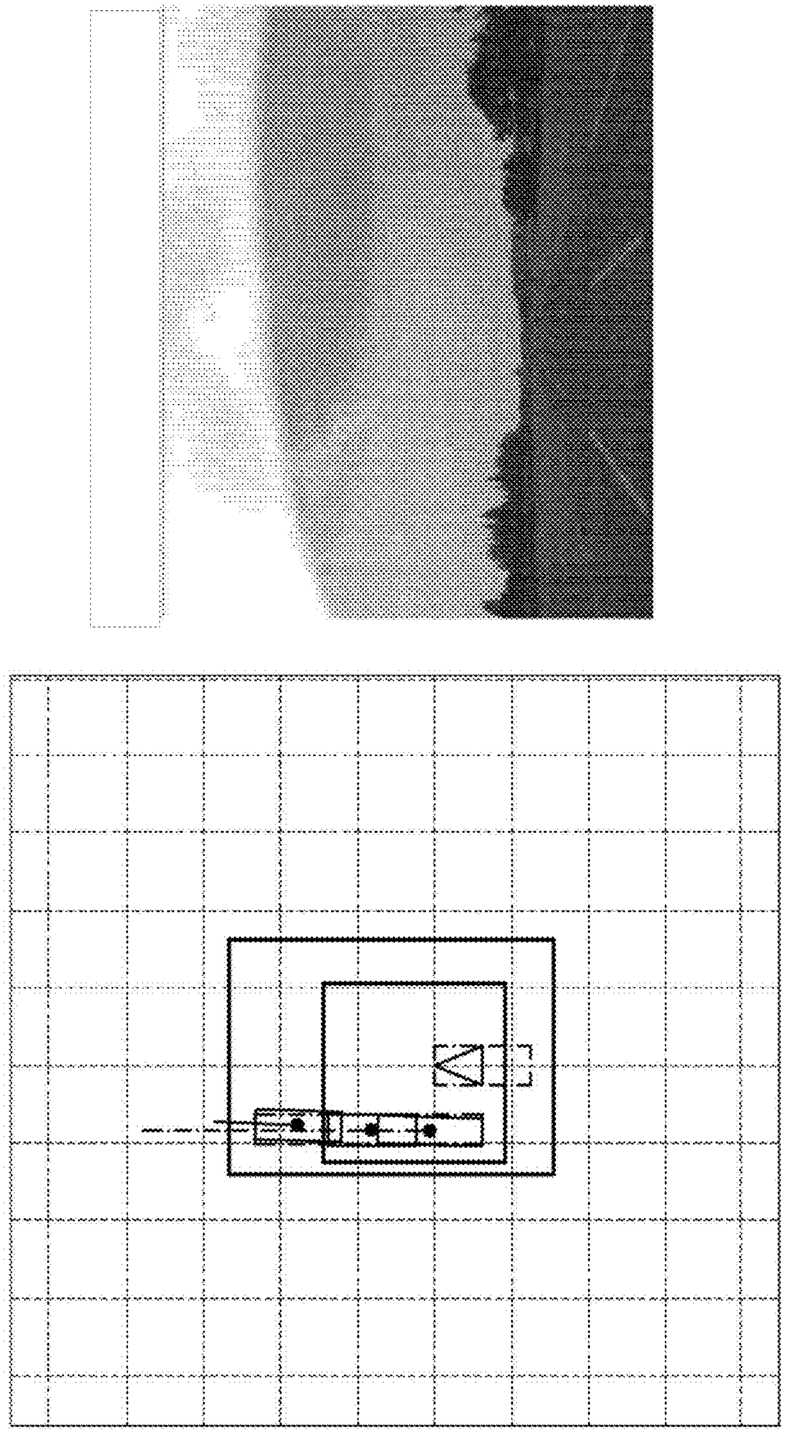
Figure 14:
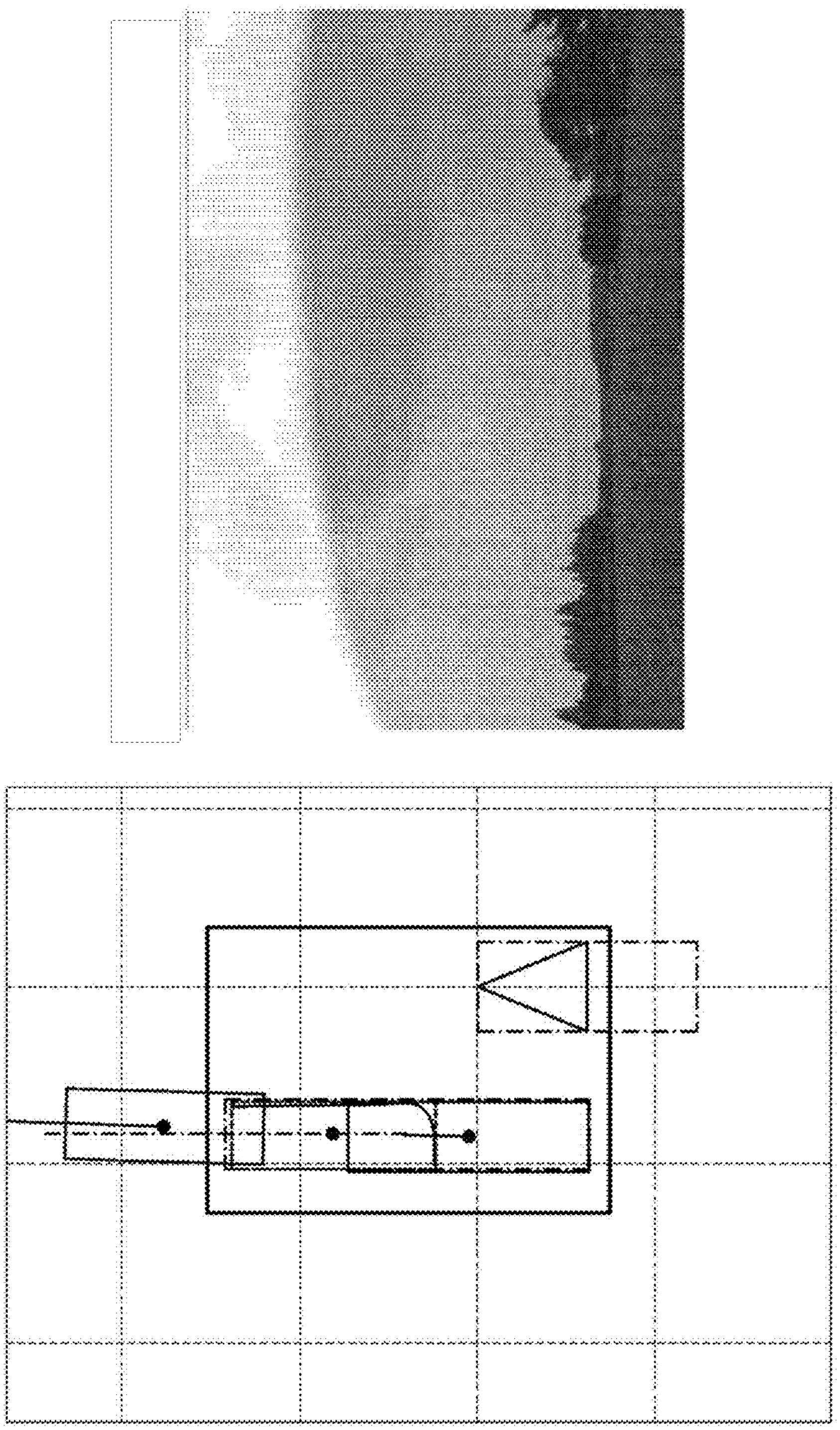

FIGS. 13 and 14 show actual simulation results in an absorption and merging condition strengthening process.

When there is a length processing part for one DOF track in an association module, and the absorption and merging is applied to a DOF track with the processed length, there may be an issue in which the length becomes excessively long, as shown in FIG. 13.

Accordingly, as shown in FIG. 14, the absorption and merging performance may be strengthened by not applying the absorption and merging to the DOF track with the processed length in the association module. As a detailed description of this, the condition of E7 shown in FIG. 5 may be added to strengthen the absorption and merging performance.

Figure 15:
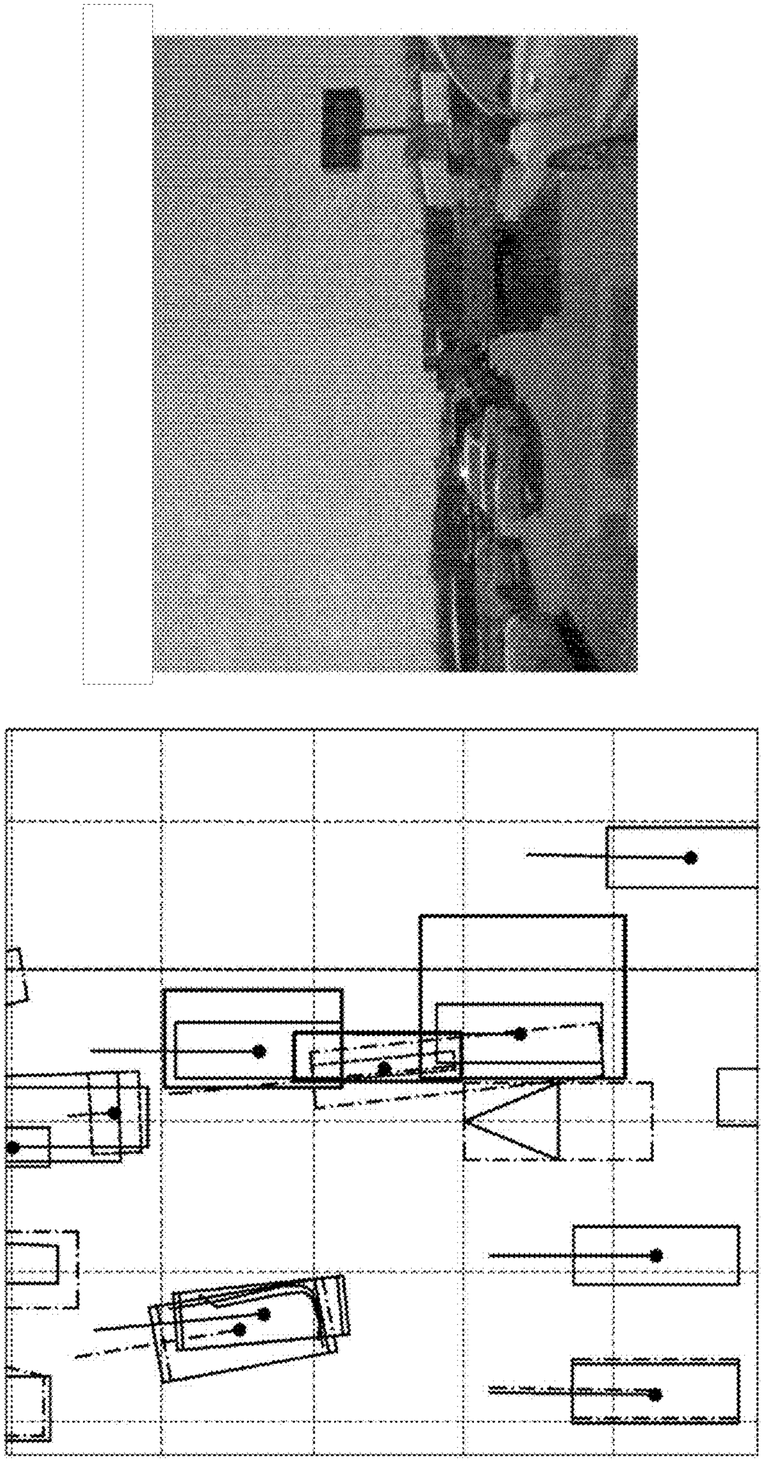
Figure 16:
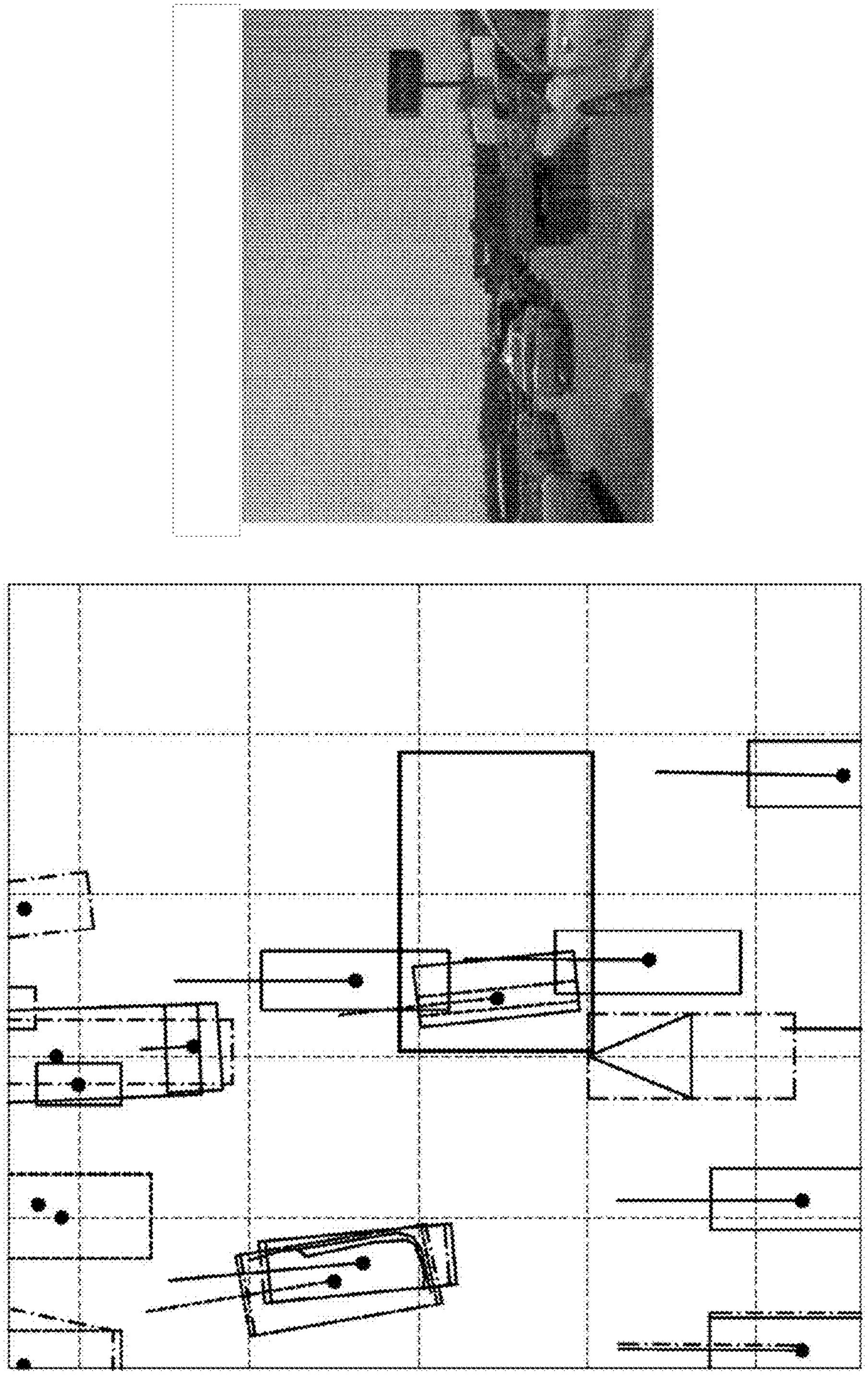
Figure 17:
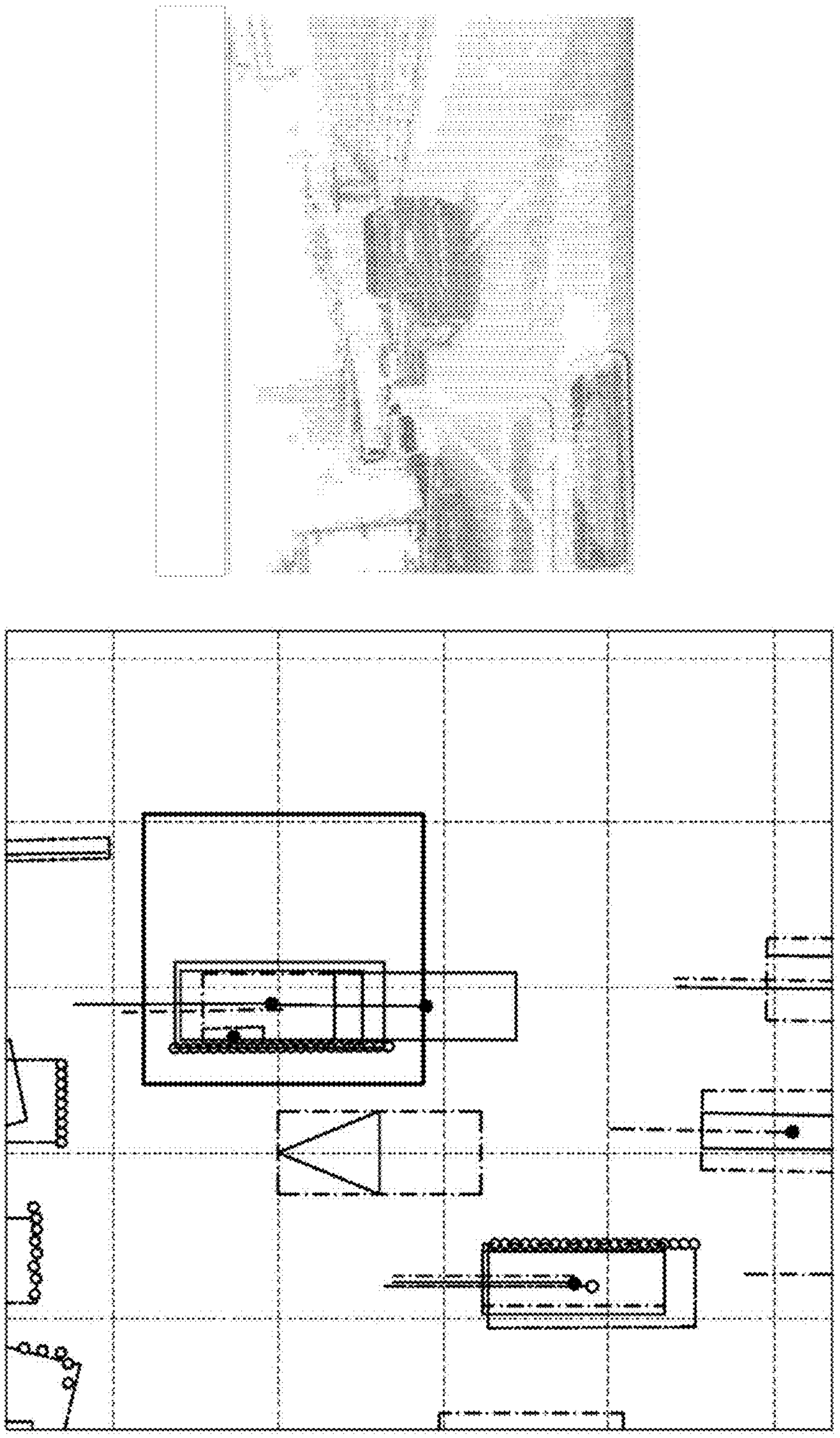

FIGS. 15-17 show actual simulation results of a condition strengthening process for solving a trade-off issue (e.g., merge trade-off) in the absorption and merging.

As shown in FIG. 15, there may be a phenomenon in which two CR-only SF tracks (purple) are generated for a sedan on a right side of a host vehicle. This may relate to a low-speed CR limitation. Accordingly, in a case of a DOF track (white), the absorption and merging may operate, and an absorption and merging issue in which a longitudinal position is not reasonable may occur.

As shown in FIG. 16, adding the condition of E6 shown in FIG. 5 and strengthening the absorption and merging conditions may solve the issue and the longitudinal position of the DOF track (white) may thus become reasonable.

The condition of E6 shown in FIG. 5 may be that a difference between a longitudinal position of a center point of a front bumper of the CR-only SF track of the first DOF track and a longitudinal position of a center point of a rear bumper of a CR track of the second DOF track is within 2 m.

As shown in FIG. 17, there may be a phenomenon in which two CR-only SF tracks (purple) are generated for a light-weight vehicle on a right side of a host vehicle. This may relate to a low-speed CR limitation. Accordingly, in a case of an existing DOF track (white), the absorption and merging may operate, and an absorption and merging issue in which a longitudinal position is not reasonable may occur.

As shown in FIG. 17, adding the condition of E7 shown in FIG. 5 and strengthening the absorption and merging conditions may solve the issue and the longitudinal position of the DOF track (white) may thus become reasonable.

The condition of E7 shown in FIG. 5 may be that a difference between a longitudinal position of a center point of a front bumper of the CR-only SF track of the first DOF track and a longitudinal position of a center point of a rear bumper of an FCL track (green) of the second DOF track is within 1.3 m.

The present disclosure described above may be embodied as computer-readable code on a medium in which a program is recorded. The computer-readable medium includes all types of recording devices in which data readable by a computer system is stored. Examples of the computer-readable medium include a hard disk drive (HDD), a solid-state drive (SSD), a silicon disk drive (SDD), a read-only memory (ROM), a random-access memory (RAM), a CD-ROM, a magnetic tape, a floppy disk, an optical data storage device, and the like.

The foregoing detailed description should not be construed as restrictive but be considered illustrative in all respects. The scope of the present disclosure should be determined by a reasonable interpretation of the appended claims, and all modifications within the equivalent scope of the present disclosure are considered included in the scope of the present disclosure.

What is claimed is:

1. A vehicle, comprising:

a sensing device comprising one or more sensors configured to obtain information on a target object present around the vehicle; and a sensor information fusion device comprising a processor configured to generate or maintain a sensor fusion track using the information on the target object provided by the sensing device, wherein the processor is configured to:

generate two or more dynamic object fusion (DOF) tracks using the information on the target object provided by the one or more sensors, determine, based on a predetermined condition, a similarity between the generated two or more DOF tracks, generate the sensor fusion track by merging two different DOF tracks among the two or more DOF tracks based on the similarity, wherein the processor is configured to, based on the two different DOF tracks overlapping with each other, add a size of a length of one of the two different DOF tracks to a longitudinal position of the other of the two different DOF tracks to output a single DOF track, and manage the generated sensor fusion track.

2. The vehicle of claim 1, wherein the processor is further configured to:

assign an identifier (ID) and an age to each DOF track;

update the age; and when a DOF track satisfies a coasting age, control the DOF track to disappear.

3. The vehicle of claim 2, wherein the age increases as the updating is performed.

4. The vehicle of claim 3, wherein the processor is configured to:

convert the DOF track to a coasting DOF track when the coasting age is satisfied, and delete the coasting DOF track when the coasting age reaches a preset value.

5. The vehicle of claim 1, wherein the processor is configured to:

use a longitudinal position of a smaller DOF track of the two different DOF tracks that are different in a longitudinal direction when a specific condition is satisfied.

6. The vehicle of claim 5, wherein the processor is configured to:

add a size of a length of the other remaining DOF track, among the two different DOF tracks, to the longitudinal position of the smaller DOF track to output the single DOF track.

7. The vehicle of claim 6, wherein a condition for entry into absorbing and merging the two different DOF tracks is satisfied when:

indices of the two different DOF tracks are different, respective IDs of the two different DOF tracks are valid, a status of the two different DOF tracks is not an initial value, and the two different DOF tracks correspond to the vehicle.

8. The vehicle of claim 7, wherein a condition for application of absorbing and merging the two different DOF tracks is satisfied when:

an overlapping area of the two different DOF tracks is greater than 0.1 square meters, a longitudinal position of each of the two different DOF tracks is less than 6 meters (m), respective horizontal positions of the two different DOF tracks are left/right side lanes, a difference in horizontal position between the two different DOF tracks is less than 0.7 m, a longitudinal position of a DOF track to be absorbed of the two different DOF tracks is greater than a longitudinal position of an absorbing DOF track of the two different DOF tracks, a difference between a longitudinal position of a center point of a front bumper of a corner radar (CR) track of one of the two different DOF tracks and a longitudinal position of a center point of a rear bumper of the CR track of the other one of the two different DOF tracks is within 2 m, a difference between the longitudinal position of the center point of the front bumper of the CR track of one of the two different DOF tracks and a longitudinal position of a center point of the rear bumper of a front corner lidar (FCL) track of the other one of the two different DOF track is within 1.3 m, and a CR is comprised in each of the two different DOF tracks, an FCL is comprised in each of the two different DOF tracks, or an FCL is only in the DOF track to be absorbed.

9. The vehicle of claim 8, wherein a condition for execution of absorbing and merging the two different DOF tracks is satisfied when:

the absorbing and merging have been completed on the two different DOF tracks, a length of the DOF track to be absorbed is added to an absolute value of a difference in longitudinal position between the two different DOF tracks, the FCL is not present in the absorbing DOF track of the two different DOF tracks, and the FCL is present in the DOF track to be absorbed of the two different DOF tracks, in the presence of the FCL in both the two different DOF tracks, a length of the FCL in the absorbing DOF track is smaller than a length of the FCL in the DOF track to be absorbed, and a longitudinal position of the DOF track on which the absorbing and merging have been completed is set to a longitudinal position of the absorbing DOF track.

10. The vehicle of claim 9, wherein the processor is configured to:

when the absorbing and merging have been completed on the two different DOF tracks, delete the DOF track, among the two different DOF tracks, that has been absorbed and merged.

11. A method for absorbing and merging sensor fusion tracks using a sensor information fusion device of a vehicle, the method comprising:

generating, by a processor of the sensor information fusion device, two or more dynamic object fusion (DOF) tracks using information on a target object around the vehicle, the information provided by one or more sensors;

determining, by the processor based on a predetermined condition, a similarity between the generated two or more DOF tracks;

generating, by the processor, a sensor fusion track by merging two different DOF tracks among the two or more DOF tracks based on the similarity, wherein merging the two different DOF tracks includes, based on the two different DOF tracks overlapping with each other, adding a size of a length of one of the two different DOF tracks to a longitudinal position of the other of the two different DOF tracks to output a single DOF track; and managing, by the processor, the generated sensor fusion track.

12. The method of claim 11, further comprising:

assigning, by the processor, an identifier (ID) and an age to each DOF track;

updating, by the processor, the age; and when a DOF track satisfies a coasting age, controlling, by the processor, the DOF track to disappear.

13. The method of claim 12, wherein the age increases as the updating is performed.

14. The method of claim 13, wherein:

when the coasting age is satisfied, the DOF track is converted to a coasting DOF track, and when the coasting age reaches a preset specific value, the coasting DOF track is deleted.

15. The method of claim 11, wherein the longitudinal position is a longitudinal position of a smaller DOF track among the two different DOF tracks.

16. The method of claim 15, wherein the size of the length is a size of a length of the other one among the two different DOF tracks.

17. The method of claim 16, wherein a condition for entry into absorbing and merging the two different DOF tracks is satisfied when:

indices of the two different DOF tracks are different, respective IDs of the two different DOF tracks are valid, a status of the two different DOF tracks is not an initial value, and the two different DOF tracks correspond to the vehicle.

18. The method of claim 17, wherein a condition for application of absorbing and merging the two different DOF tracks is satisfied when:

an overlapping area of the two different DOF tracks is greater than 0.1 square meters, a longitudinal position of each of the two different DOF tracks is less than 6 meters (m), respective horizontal positions of the two different DOF tracks are left/right side lanes, a difference in horizontal position between the two different DOF tracks is less than 0.7 m, a longitudinal position of a DOF track to be absorbed of the two different DOF tracks is greater than a longitudinal position of an absorbing DOF track of the two different DOF tracks, a difference between a longitudinal position of a center point of a front bumper of a corner radar (CR) track of one of the two different DOF tracks and a longitudinal position of a center point of a rear bumper of the CR track of the other one of the two different DOF tracks is within 2 m, a difference between the longitudinal position of the center point of the front bumper of the CR track of one of the two different DOF tracks and a longitudinal position of a center point of the rear bumper of a front corner lidar (FCL) track of the other one of the two different DOF track is within 1.3 m, and a CR is comprised in each of the two different DOF tracks, an FCL is comprised in each of the two different DOF tracks, or an FCL is only in the DOF track to be absorbed.

19. The method of claim 18, wherein a condition for execution of absorbing and merging the two different DOF tracks is satisfied when:

the absorbing and merging have been completed on the two different DOF tracks, a length of the DOF track to be absorbed is added to an absolute value of a difference in longitudinal position between the two different DOF tracks, the FCL is not present in the absorbing DOF track of the two different DOF tracks, and the FCL is present in the DOF track to be absorbed of the two different DOF tracks, in the presence of the FCL in both the two different DOF tracks, a length of the FCL in the absorbing DOF track is smaller than a length of the FCL in the DOF track to be absorbed, and a longitudinal position of the DOF track on which the absorbing and merging have been completed is set to a longitudinal position of the absorbing DOF track.

20. The method of claim 19, further comprising when the absorbing and merging have been completed on the two different DOF tracks, deleting, by the processor, a DOF track that has been absorbed and merged, of the two different DOF tracks.

* * * * *